United States Patent
Quillin

(10) Patent No.: US 10,751,572 B2
(45) Date of Patent: *Aug. 25, 2020

(54) DUAL MONITORING INSTRUCTION SYSTEM AND METHOD

(71) Applicant: Fred Quillin, Jenison, MI (US)

(72) Inventor: Fred Quillin, Jenison, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/190,134

(22) Filed: Nov. 13, 2018

(65) Prior Publication Data

US 2019/0076700 A1 Mar. 14, 2019

Related U.S. Application Data

(63) Continuation-in-part of application No. 16/128,316, filed on Sep. 11, 2018.

(60) Provisional application No. 62/557,698, filed on Sep. 12, 2017.

(51) Int. Cl.

| | |
|---|---|
| *H04N 7/18* | (2006.01) |
| *G09B 5/02* | (2006.01) |
| *A63B 24/00* | (2006.01) |
| *H04N 5/232* | (2006.01) |
| *A63B 69/36* | (2006.01) |
| *H04N 5/655* | (2006.01) |
| *H04N 5/268* | (2006.01) |
| *H04N 5/247* | (2006.01) |
| *F16M 11/00* | (2006.01) |
| *G08B 13/196* | (2006.01) |
| *G09B 19/00* | (2006.01) |

(52) U.S. Cl.
CPC ...... *A63B 24/0062* (2013.01); *A63B 24/0003* (2013.01); *A63B 69/36* (2013.01); *F16M 11/00* (2013.01); *G08B 13/19641* (2013.01); *G09B 5/02* (2013.01); *G09B 19/0038* (2013.01); *H04N 5/23241* (2013.01); *H04N 5/247* (2013.01); *H04N 5/268* (2013.01); *H04N 5/655* (2013.01); *H04N 7/181* (2013.01)

(58) Field of Classification Search
CPC ................................. H04N 7/181; G09B 5/02
USPC ........................................................ 348/159
See application file for complete search history.

(56) References Cited

U.S. PATENT DOCUMENTS

| | | | | |
|---|---|---|---|---|
| 5,749,789 A | * | 5/1998 | Karl ...................... | A63B 67/02 473/158 |
| 6,394,615 B1 | * | 5/2002 | Hill ....................... | G06F 1/1601 348/834 |
| 2004/0239823 A1 | * | 12/2004 | Silsby ............... | G02F 1/133502 349/40 |

(Continued)

*Primary Examiner* — Jeffery A Williams
(74) *Attorney, Agent, or Firm* — Charles Runyan

(57) ABSTRACT

A surveillance network is disclosed herein. The surveillance network includes a processor, one or more video cameras, a student-monitor, and an instructor-monitor. The processor can transmit and receive digital information. The video cameras can communicate digitally with the processor and can record video and transmit the video signal to the processor. The student-monitor and the instructor-monitor are each also able to communicate digitally with the processor and may each play back video as received from the processor. The processor may transmit either a live or recorded video signal to both the student-monitor and the instructor-monitor, such that the student-monitor and the instructor-monitor receive and play back video simultaneously.

13 Claims, 5 Drawing Sheets

(56) References Cited

U.S. PATENT DOCUMENTS

| | | | | |
|---|---|---|---|---|
| 2006/0040761 A1* | 2/2006 | Shin | ................... | A63B 24/0021 |
| | | | | 473/278 |
| 2006/0276255 A1* | 12/2006 | Hutchison | .............. | A63B 67/02 |
| | | | | 473/159 |
| 2010/0081116 A1* | 4/2010 | Barasch | ............. | A63B 24/0003 |
| | | | | 434/252 |
| 2013/0123034 A1* | 5/2013 | Pohl | ................... | G09B 19/0038 |
| | | | | 473/220 |
| 2014/0247363 A1* | 9/2014 | Venable, Jr. | ........... | H04N 7/181 |
| | | | | 348/159 |
| 2014/0308640 A1* | 10/2014 | Forman | ................ | G09B 19/003 |
| | | | | 434/258 |
| 2017/0191607 A1* | 7/2017 | Huang | ............... | F16M 11/2014 |
| 2017/0296898 A1* | 10/2017 | Brosseau, Jr. | ...... | A63B 69/3661 |

* cited by examiner

DUAL MONITORING INSTRUCTION SYSTEM AND METHOD

CROSS-REFERENCE TO RELATED APPLICATION(S)

This application relates to and claims priority to currently pending U.S. patent application Ser. No. 16/128,316 filed Sep. 11, 2018, which relates to and incorporates by reference U.S. provisional patent application 62/557,698 filed Sep. 12, 2017, the contents of both are incorporated herein by reference in their entirety.

BACKGROUND OF THE INVENTION

The following includes information that may be useful in understanding the present disclosure. It is not an admission that any of the information is prior art nor material to the presently described or claimed inventions, nor that any publication or document that is explicitly or implicitly referenced is prior art.

Technical Field

The present invention generally relates to the field of surveillance systems of existing art and more specifically relates to a golfer's instruction monitoring system.

Related Art

Many people enjoy the game of golf. Golf is a club and ball sport in which players use various clubs to hit balls into a series of holes on a course in as few strokes as possible. While golf is often played merely for relaxation, comradery, and enjoyment, golf can also be a competitive sport. As a result, many golfers train to improve their technique and are continually looking for ways to improve.

Many instructors focus on teaching proper swing techniques using video feedback. Teaching often includes an instructor recording a golfer's swing and then halting activity and conducting a post-swing analysis of the positive and negative aspects associated with the student's swings. They may also playback the video for the student to share commentary and recommendations. However, because the student is not able to see or feel what a mistake feels like in the moment and understand what a good swing feels like, this process can be confusing, embarrassing, and ineffective. The recordings and post-swing analysis do not enable the instructor to share on-the-spot feedback and instruction, which can be beneficial and help the student achieve faster and more significant results. A suitable solution is desired.

U.S. Pat. No. 7,780,450 to Robin Tarry relates to a video instructional system and method for teaching motor skills. The described video instructional system and method for teaching motor skills include a system by which a real-time camera image of a student is displayed to the student while the student is performing a physical activity. The student can switch between seeing his natural field of view and the live video image by refocusing his eyes. Additionally, instructional information may be overlaid on the real-time video, thus enhancing the learning process.

SUMMARY OF THE INVENTION

Given the foregoing disadvantages inherent in the known surveillance system art, the present disclosure provides a novel dual monitoring instruction system and method. The general purpose of the present disclosure, which will be described subsequently in greater detail, is to provide a dual monitoring instruction system and method.

A surveillance network is disclosed. The surveillance network includes a processor, one or more video cameras, a student-monitor, and an instructor-monitor. The processor can transmit and receive digital information. The video cameras can communicate digitally with the processor and can record video and transmit the video signal to the processor. The student-monitor and the instructor-monitor are each also able to communicate digitally with the processor and may each play back video as received from the processor. The processor may transmit either a live or recorded video signal to both the student-monitor and the instructor-monitor, such that the student-monitor and the instructor-monitor receive and play back video simultaneously.

According to another embodiment, a method of displaying a video feed to a student and an instructor simultaneously is also disclosed. The method of displaying a video feed to a student and an instructor simultaneously includes providing the above-described surveillance network, recording video footage via the video cameras, transmitting the live video signal from one or more video cameras to the central processor, transmitting the live video signal from the central processor to both the student-monitor and the instructor-monitor simultaneously, selecting at least one of one or more video cameras for viewing, and playing back the recorded video signal for viewing.

For purposes of summarizing the invention, certain aspects, advantages, and novel features of the invention have been described. Not necessarily all such advantages may be achieved by any one particular embodiment of the invention. Thus, the invention may be embodied or carried out in a manner that achieves or optimizes one advantage or group of advantages without necessarily achieving other advantages. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a dual monitoring instruction system and method, constructed and operative according to the teachings of the present disclosure.

DETAILED DESCRIPTION

Figure 1:
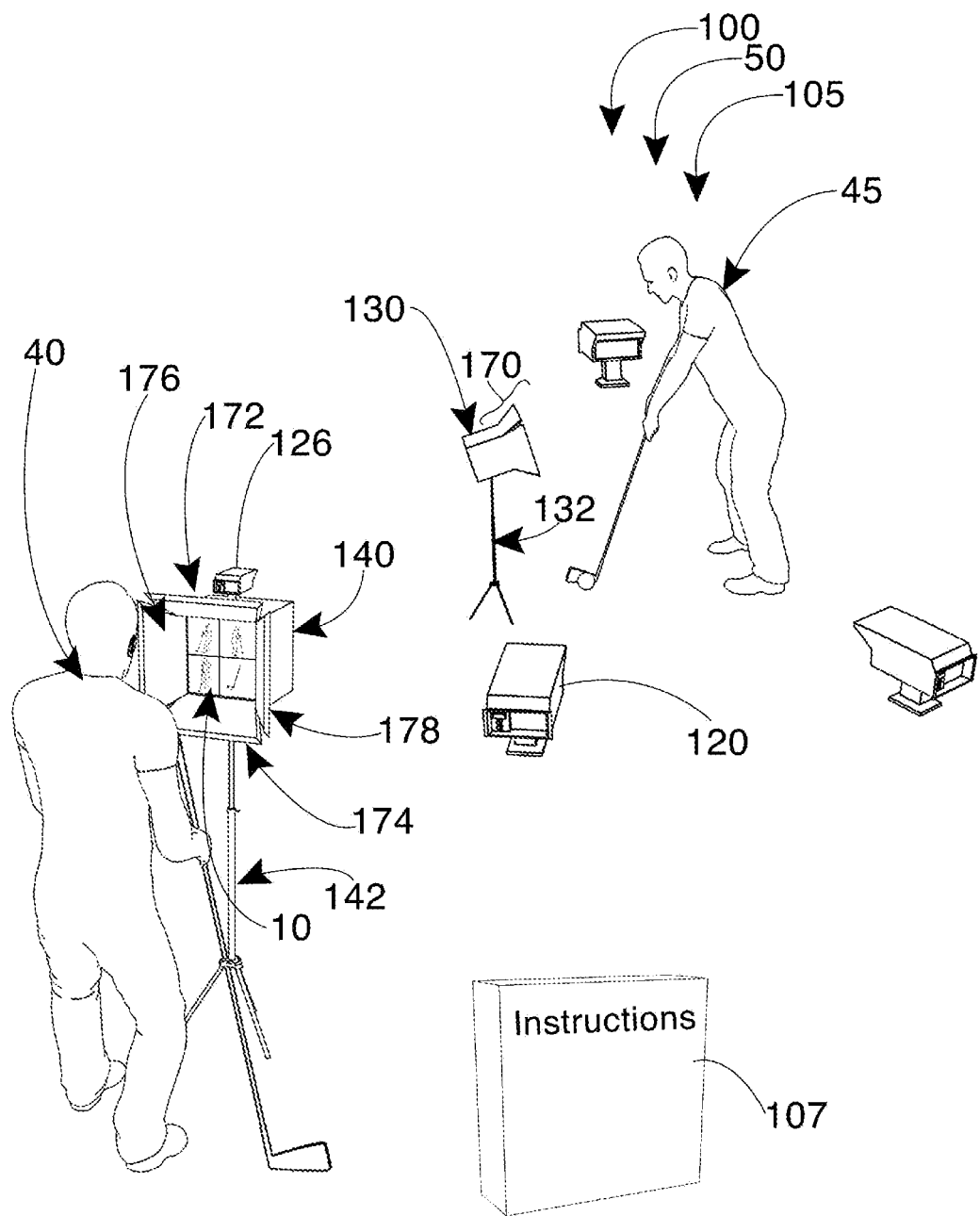
FIG. 1 is a perspective view of the surveillance network during an 'in-use' condition, according to an embodiment of the disclosure.

As discussed above, embodiments of the present disclosure relate to a surveillance system and more particularly to a dual monitoring instruction system and method as used to improve the simultaneous displaying a video feed to a student and an instructor.

Generally, the surveillance system is a monitoring system that can be viewed by an instructor and student simultaneously in real time. While a primary application of the system is for golfing instruction, the system may be useful for any situation in which a student and an instructor desire to simultaneously view the student's technique either in real time or playback. That is, instruction in which immediate feedback from the instructor is useful such as yoga, baseball swinging, basketball free-throws, personal exercise training, tennis, etc. The system may be used by a single user but is most advantageous when used by a student and an instructor simultaneously. Preferably, the system includes at least four, closed-circuit television cameras, and an instructor-monitor and student-monitor each able to view footage from the cameras. The system can be configured to use wireless or wired cameras. In use, the system may be a beneficial training aid that allows both the instructor and the student to view and analyze techniques in real time or recordings. This configuration enables the complete or partial recording of training sessions. In some embodiments, additional auxiliary devices may interface with the system, including smartphones, tablets, or laptops. In such embodiments, the auxiliary devices may be used as additional monitors to view or playback the same footage as the student-monitor and the instructor-monitor. Viewing the live or recorded footage may assist the student in identifying and analyzing mistakes in their technique in a way not possible otherwise. This usage may help develop and promote muscle memory for improved techniques.

The system may include multiple cameras able to record footage of a student, an instructor-monitor optionally placed on an instructor-portable podium, a student-monitor optionally placed on a student-adjustable monitor, and a processor connecting the cameras, instructor-monitor, and student-monitor. The system may also include one or more transceivers for enabling the components to communicate with each other. Additionally, the system may include a portable hitting area that is useful as a guideline for placement of the users, the cameras, the instructor-monitor, and the student-monitor. More than four cameras may be added for any view angle or perspective (e.g., from above), providing the users with a variety of viewing angles to analyze a technique with. The cameras send a picture feed to the processor. One instructor-monitor may receive all camera feeds from the processor. Likewise, one student-monitor may receive all the camera feeds from to processor in tandem with the instructor-monitor. The processor may be a personal computer using the appropriate software in some embodiments. The instructor-monitor will, in turn, have the ability to review activity from one or more cameras simultaneously or selectively. This review may be enacted remotely. The system may also include a power source, preferably a battery, that allows several hours of operation. The system may also incorporate power adapters for utilizing 120V household voltage sources. In some embodiments, one or more of the monitors can have touchscreen or pen input capability. In some version, the instructor could draw on the video to highlight certain aspects of the recorded activity. An instructor could use this functionality to indicate at what point in the swing for instance the student needs modify or to indicate a change in body position etc.

In these or other embodiments, the system could transmit an instructor's motion in real-time or recorded for later playback to the student's monitor. In such embodiments, the instructor could use the pen input or touchscreen capability to highlight the correct portions of the instructor's swing. For instance, the instructor could indicate a portion of the swing for the student to focus on.

The system may also include a portable hitting area. The hitting area may be a flat, deployable surface having indicia for guiding the placement of the user and the components of the system in use. The hitting area may include indicia, such as for positioning a player's feet, where the user is to swing and hit a golf ball, and where the user is to aim the golf ball's trajectory. Other indicia may be incorporated. In some embodiments, the bottom surface of the hitting area may be rubber, and the top surface of the hitting area may be an artificial turf-like material. In some embodiments, the hitting area measures approximately 2 feet by 1.5 feet and 1.0 inch in depth. These dimensions permit the hitting area to be portable and convenient for movement to various training locations. Preferably, the hitting area is thin enough to be rolled for portability. In some embodiments, a collapsible and portable tent or net may be incorporated with the hitting area.

In operation, the student stands on the hitting area at the indicated position. The student-monitor may be located directly adjacent to the swing path of the club in a position viewable by the student as they swing. Cameras may be aimed at the student at various angles and focus to record aspects of the student's technique. The instructor-monitor may be placed where an instructor may view it. In some circumstances, the instructor-monitor may be an external mobile device rather than the dedicated monitor. The monitor may enable the instructor to focus on the student's swing patterns and make recommendations to the student in real time. Throughout a training session, both the student and instructor may have the ability to view the student's performance on the same video feed of the student's technique. In some embodiments, the system may be further equipped with sensory devices able to measure and display data such as swing speed. The instructor-monitor may also be able to record the camera video feeds for later review. For example, some instructors feel that to improve the putting stroke, the putter head path to the ball should be square to the target. The system allows cameras to be stationed for a ground view, which can show the path the putter head takes to the ball and the target. The exact specifications of the system components may vary.

In some embodiments, a home system could use 1 to 4 cameras where students could use one camera and one monitor to view themselves practice their swing. Further, if desired, a split screen could be used (not required) with an instructional feed. In a similar manner, students could watch themselves at home after taking lessons. They could also view instructional materials before or during their practice at home. For all of this, less than 4 monitors would be sufficient. In addition, a hitting net could be used in a back yard or an out building.

In these or other embodiments, the camera could also be positioned on the ground to view the path of the putter as a putt is stroked. This is a very valuable teaching tool.

Referring now to the drawings by reference numerals, FIGS. 1-4 show various views of a surveillance network 100.

FIG. 1 shows a surveillance network during an 'in-use' condition 50, according to an embodiment of the present disclosure. Here, the surveillance network may be beneficial for use by a user 40 to simultaneously display a video feed to a student and an instructor. As illustrated, the surveillance network 100 may include student-monitor 130 and instructor-monitor 140. Surveillance network 100 may be able to simultaneously provide video footage 10 to instructor-user 40 and student-user 45 as shown. In one embodiment, one or more video cameras 120 may include at least one instructor-camera 126 integrated into instructor-monitor 140. Instructor-monitor 140 may be selectively positionable to capture video of instructor-user 40 while instructor-user 40 is viewing instructor-monitor 140. Student-monitor 130 may include student-podium 132 for supporting student-monitor-130 above the ground in some embodiments as shown. Likewise, instructor-monitor 140 may include instructor-podium 142 for supporting instructor-monitor 140 above the ground. Preferably, student-monitor 130 and instructor-monitor 140 may each include rectangular sunshades 170. Rectangular sunshades 170 may be configured for preventing glare when instructor-user 40 or student-user 45 is viewing student-monitor 130 or instructor-monitor 140. Each of rectangular sunshades 170 may include top shade 172, bottom shade 174, left shade 176, and right shade 178. Top shade 172, bottom shade 174, left shade 176, and right shade 178 may be arranged perpendicularly to each other, such that they define a rectangular channel through which instructor-user 40 or student-user 45 may view student-monitor 130 or instructor-monitor 140. In a preferred embodiment, each of rectangular sunshades 170 extend up to twenty inches from student-monitor 130 and alternatively instructor-monitor 140.

In addition to the instructor-monitor 140 and student-monitor 130, various embodiments of the system employ additional monitors (not shown). These monitors can function to allow spectators to watch the instruction session or allow team members to follow along as a team mate receives instruction.

According to one embodiment, the surveillance network 100 may be arranged as a kit 105. In particular, the surveillance network 100 may further include a set of instructions 107. The instructions 107 may detail functional relationships about the structure of the surveillance network 100 such that the surveillance network 100 can be used, maintained, or the like, in a preferred manner.

Figure 2:
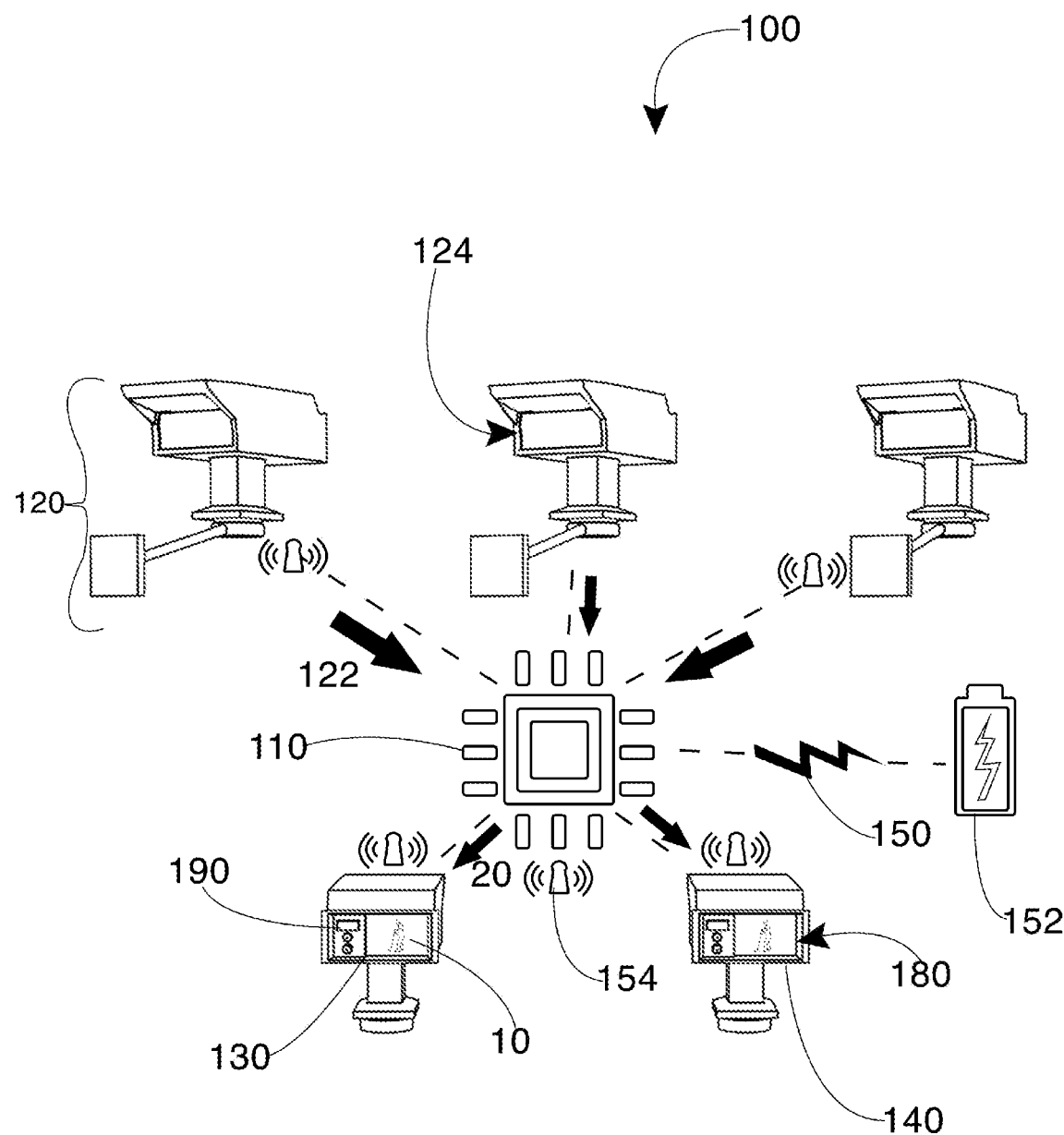
FIG. 2 is a perspective view of the surveillance network of FIG. 1, according to an embodiment of the present disclosure.

FIG. 2 shows the surveillance network of FIG. 1, according to an embodiment of the present disclosure. As above, surveillance network 100 may include student-monitor 130 and instructor-monitor 140. Surveillance network 100 may further include processor 110 and one or more video cameras 120. Processor 110 may be able to transmit and receive digital information 20. In particular, processor 110 may be configured to receive digital information 20 from one or more video of cameras 120 and transmit digital information 20 to student-monitor 130 and instructor-monitor 140. Processor 110 may receive and transmit digital information 20 wirelessly or by other means. One or more video cameras 120 may be in digital communication with processor 110 and may be configured to record video and transmit it as digital information 20 to processor 110. Student-monitor 130 may also digitally communicate with processor 110 and may playback video. Likewise, instructor-monitor 140 may be in digital communication with processor 110, and six configured to playback video. Processor 110 transmits digital information 20 to both student-monitor 130 and instructor-monitor 140 simultaneously. Digital information 20 may comprise either a live video signal or a recorded video signal. Some embodiments have at least four closed-circuit television cameras 124. Surveillance network 100 may further comprise power source 150 providing power to processor 110, power source 150 including at least one battery 152. Power source 150 may further comprise multiple batteries 152 providing power to processor 110, plurality of video cameras 120, student-monitor 130, and instructor-monitor 140. In one embodiment, processor 110, plurality of video cameras 120, student-monitor 130, and instructor-monitor 140 each include at least one transceiver 154. At least one transceiver 154 may be able to communicate wirelessly with processor 110 and alternatively with each other. In other embodiments, processor 110, one or more video cameras 120, student-monitor 130, and instructor-monitor 140 may be hard-wired. In a preferred embodiment, student-monitor 130 and instructor-monitor 140 each include antiglare screens 180. Both student-monitor 130 and instructor-monitor 140 may each further include camera selection means 190: camera selection means 190 is configured to enable instructor-user 40 (FIG. 1) and alternatively student-user 45 (FIG. 1) to select either the live video signal or the recorded video signal corresponding to at least one video cameras 120.

Figure 3:
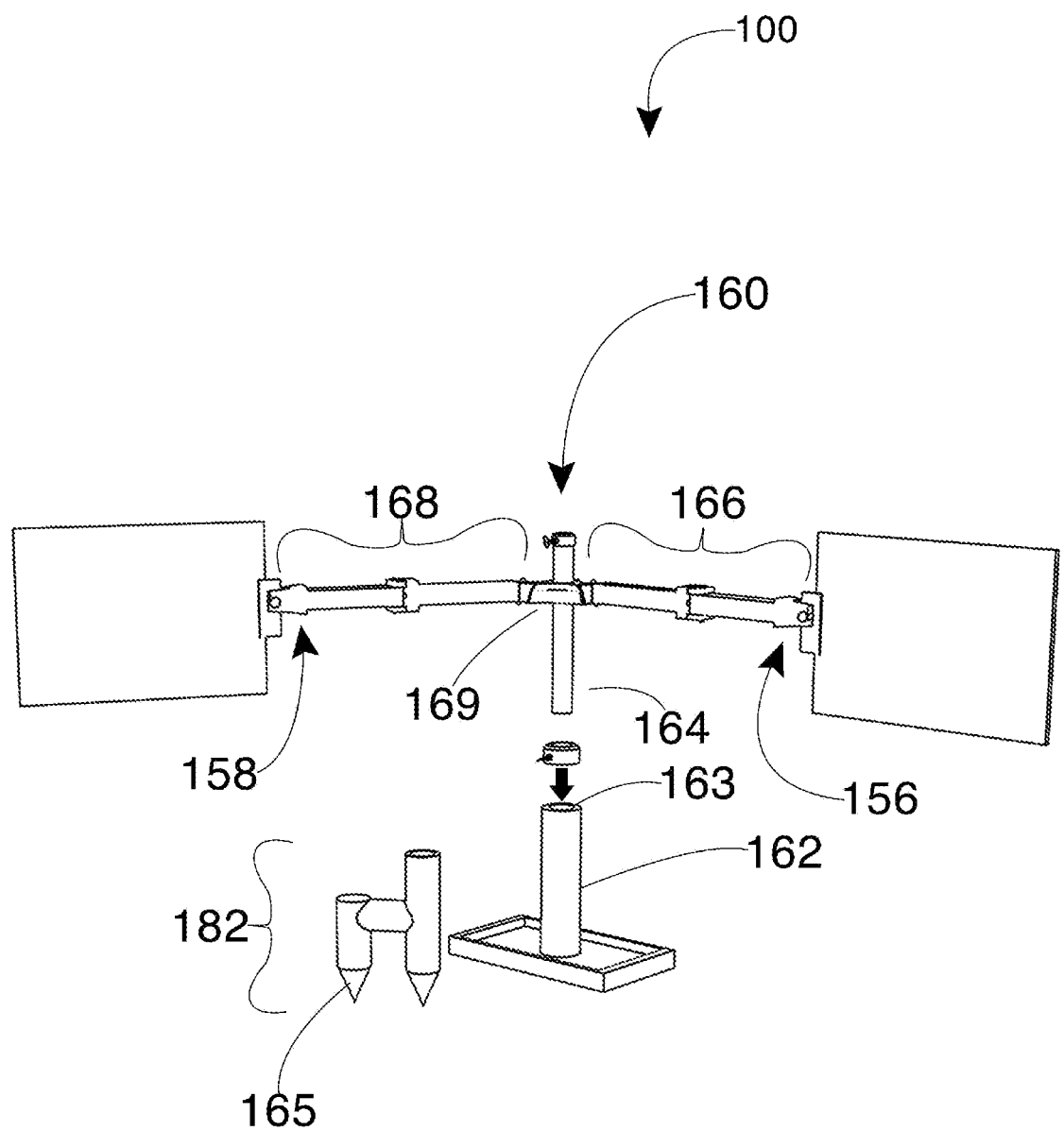
FIG. 3 is a perspective view of the surveillance network of FIG. 1, according to an embodiment of the present disclosure.

FIG. 3 is a partially exploded, perspective view of the monitor stand 160 of FIG. 1, according to an embodiment of the present disclosure. Surveillance network 100 may further include monitor stand 160 having support frame 162, vertical support 164, first cantilever 166, second cantilever 168, and cantilever mount 169. Support frame 162 may be configured to support monitor stand 160 upon the ground. Vertical support 164 may be rigidly coupled to support frame 162 and may extend outwardly from support frame 162. First cantilever 166 may couple to instructor-monitor 140 for suspending instructor-monitor 140 from monitor stand 160. First cantilever 166 may include first plurality of articulated joints 156 able to be selectively positioned by instructor-user 40. Second cantilever 168 may be coupled to student-monitor 130 for suspending student-monitor 130 from monitor stand 160. Second cantilever 168 may include second plurality of articulated joints 158 able to be selectively positioned by student-user 45. Cantilever interface 169 may couple both first cantilever 166 and second cantilever 168 to vertical support 164. Cantilever interface 169 may be itself articulated. In some embodiments, first cantilever 166 and second cantilever 168 may mirror each other across cantilever interface 169. Support frame 162 may include receiver 163. Receiver 163 may be tubular and may have a sufficiently large diameter to receive and support vertical support 164. Vertical support 164 may be able to rotate within receiver 163. In one embodiment, vertical support 164 may include at least one tapered terminus 165. At least one tapered terminus 165 may be configured for insertion into soil. In some embodiments, monitor stand 160 may further include stake assembly 182. Preferably, stake assembly 182 includes two of at least one tapered terminus 165. Stake assembly 182 may be insertable between support frame 162 and vertical support 164. Alternatively, stake assembly 182 may be inserted into the ground and affixed to vertical support 164, such that stake assembly 182 supports monitor stand 160. At least one tapered terminus 165 of stake assembly 182 may be insertable into receiver 163.

Figure 4:
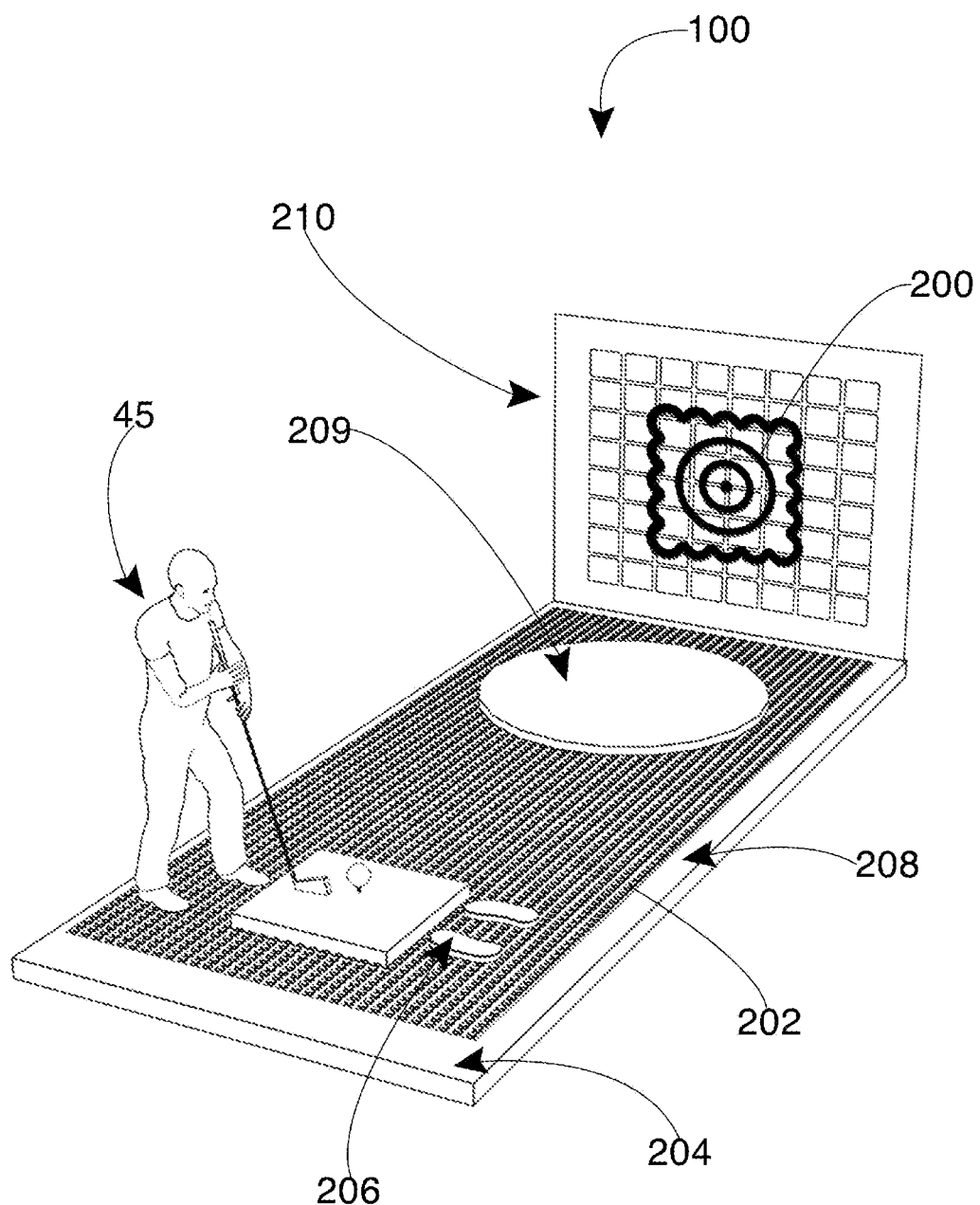
FIG. 4 is a perspective view of the portable target of the surveillance network of FIG. 1, according to an embodiment of the present disclosure.

FIG. 4 is a perspective view of the portable target of the surveillance network of FIG. 1, according to an embodiment of the present disclosure. Surveillance network 100 may further comprise portable target 200 configured to simultaneously support student-user 45 and target area 209, portable target 200 having bottom surface 202, target surface 204, indicia 206, and artificial turf 208. Bottom surface 202 may be constructed of rubber, being configured to engage the ground without sliding. Target surface 204 may be disposed opposite the bottom surface, and in some embodiments may be laminated to bottom surface 202. Indicia 206 may be disposed upon target surface 204 and may be configured to indicated positions of student-user 45 and target area 209. Target surface 204 may include artificial turf 208. In some embodiments, portable target 200 may further include net 210. Portable target 200 may be a unitary assembly or may be divided into its separable components in some embodiments.

Upon reading this specification, it should be appreciated that, under appropriate circumstances, considering such issues as user preferences, design preference, structural requirements, marketing preferences, cost, available materials, technological advances, etc., other structural arrangements such as, for example, additional sensory and communication features, alternative podium and support mechanism designs, various portable target configurations, etc., may be sufficient.

Figure 5:
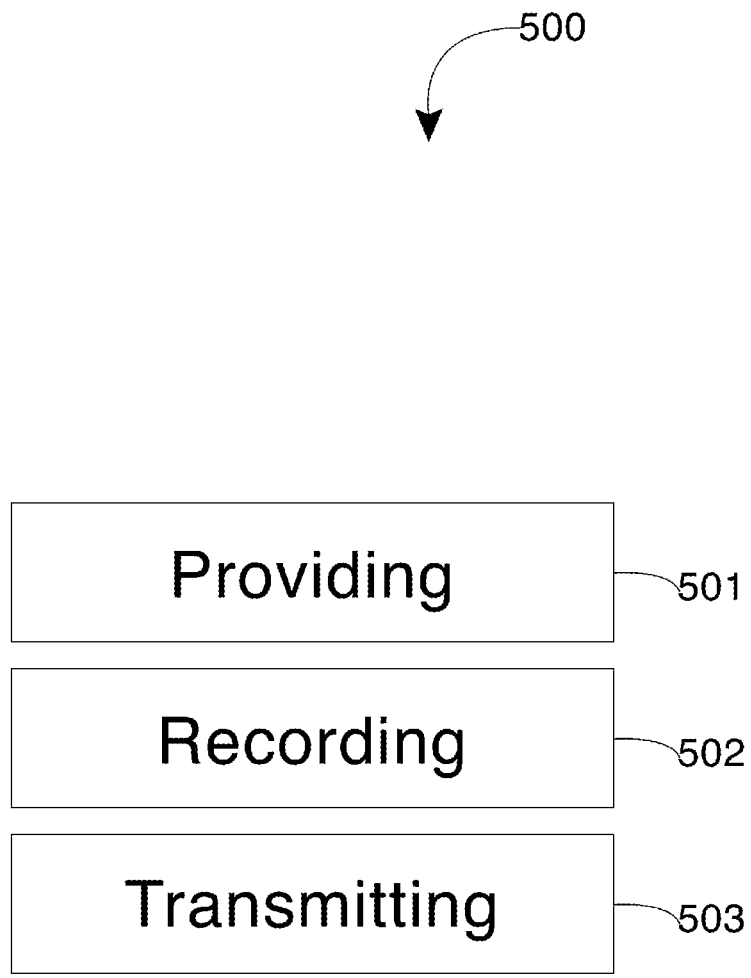
FIG. 5 is a flow diagram illustrating a method of displaying a video feed to a student and an instructor simultaneously, according to an embodiment of the present disclosure.

FIG. 5 is a flow diagram illustrating a method of displaying a video feed to a student and an instructor simultaneously, according to an embodiment of the present disclosure. In particular, the method of displaying a video feed to a student and an instructor simultaneously 500 may include one or more components or features of the surveillance network 100 as described above. As illustrated, the method of displaying a video feed to a student and an instructor simultaneously 500 may include the steps of step one 501, providing a surveillance network able to provide video footage to an instructor-user and a student-user simultaneously, the surveillance network comprising a processor able to transmit and receive digital information, one or more video cameras in digital communication with the processor, configured to record video and transmit a live video signal to the processor, a student-monitor in digital communication with the processor, the student-monitor configured to playback video, and an instructor-monitor in digital communication with the processor, the instructor-monitor configured to playback video, in which the processor can transmit either the live video signal or a recorded video signal to both the student-monitor and the instructor-monitor simultaneously. The next step, step two 502, includes recording video footage via one or more video cameras; step three 503, transmitting the live video signal from one or more video cameras to the central processor; step four 504, transmitting the live video signal from the central processor to both the student-monitor and the instructor-monitor simultaneously; step five 505, selecting at least one video camera for viewing; and step six 506, playing back the recorded video signal for viewing.

The steps described in the method of use can be carried out in many different orders according to user preference. The use of "step of" should not be interpreted as "step for", in the claims and is not intended to invoke the provisions of 35 U.S.C. § 112(f). Under appropriate circumstances, considering such issues as design preference, user preferences, marketing preferences, cost, structural requirements, available materials, technological advances, etc., other methods of displaying a video feed to a student and an instructor simultaneously, are taught.

These embodiments are exemplary, and numerous modifications, variations, and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is outlined in the appended claims:

1. A surveillance network able to simultaneously provide video footage to an instructor-user and a student-user, the surveillance network comprising:
    a processor able to transmit and receive digital information;
    a power source having a battery, powering to the processor;
    one or more video cameras in digital communication with the processor, configured to record video and transmit a live video signal to the processor;
    a student-monitor in digital communication with the processor, the student-monitor configured to playback video;
    an instructor-monitor in digital communication with the processor, the instructor-monitor configured to playback video;
    and
    a monitor stand having
        a support frame configured to support the monitor stand upon the ground;
        a vertical support rigidly coupled to and extending from the support frame;
        a first cantilever coupled to the instructor-monitor for suspending the instructor-monitor from the monitor stand, the first cantilever including a first plurality of articulated joints able to be selectively positioned by the instructor-user;
        a second cantilever coupled to the student-monitor for suspending the student-monitor from the monitor stand, the second cantilever including a second plurality of articulated joints able to be selectively positioned by the student-user;
        and
        a cantilever interface coupling the first cantilever and the second cantilever to the vertical support,
    wherein the processor can transmit either the live video signal or a recorded video signal to both the student-monitor and the instructor-monitor simultaneously.

2. The surveillance network of claim 1, comprising at least four closed-circuit television cameras.

3. The surveillance network of claim 1, including at least one instructor-camera integrated into the instructor-monitor, the instructor-monitor being selectively positionable to capture video of the instructor-user viewing the instructor-monitor.

4. The surveillance network of claim 1, further comprising a power source providing power to the processor, the power source including at least one battery.

5. The surveillance network of claim 1, wherein the vertical support includes at least one tapered terminus configured for insertion into the soil.

6. The surveillance network of claim 1, wherein the support frame includes a receiver, the receiver being tubular, the receiver having a sufficiently large diameter to receive and support the vertical support.

7. The surveillance network of claim 1, wherein one or more video cameras, the instructor-monitor, and the student-monitor each include at least one transceiver, the at least one transceiver wirelessly connected with the processor.

8. The surveillance network of claim 1, wherein the student-monitor further includes a student-podium for supporting the student-monitor above the ground.

9. The surveillance network of claim 1, wherein the instructor-monitor further includes an instructor-podium for supporting the instructor-monitor above the ground.

10. The surveillance network of claim 1, wherein both the student-monitor and the instructor-monitor each further include a camera selection means, the camera selection means being configured to enable the student-user and alternatively the instructor-user to select either the live video signal or the recorded video signal corresponding to at least one video camera.

11. A golf-instruction surveillance network able to simultaneously provide video footage to an instructor-user and a student-user, the golf-instruction surveillance network comprising:
  a processor able to transmit and receive digital information;
  at least four video cameras in digital communication with the processor configured to record video and transmit a live video signal to the processor;
  a student-monitor in digital communication with the processor, the student-monitor configured to playback video;
  an instructor-monitor in digital communication with the processor, the instructor-monitor configured to playback video;
  a power source providing power to the processor, the power source including at least one battery; and
  a monitor stand having
    a support frame configured to support the monitor stand upon the ground;
    a vertical support rigidly coupled to and extending from the support frame;
    a first cantilever coupled to the instructor-monitor for suspending the instructor-monitor from the monitor stand, the first cantilever including a first plurality of articulated joints able to be selectively positioned by the instructor-user;
    a second cantilever coupled to the student-monitor for suspending the student-monitor from the monitor stand, the second cantilever including a second plurality of articulated joints able to be selectively positioned by the student-user; and
    a cantilever interface coupling the first cantilever and the second cantilever to the vertical support,
  wherein
    the processor can transmit either the live video signal or a recorded video signal to both the student-monitor and the instructor-monitor simultaneously;
    the vertical support includes at least one tapered terminus configured to be inserted into soil;
    the support frame includes a receiver, the receiver being tubular, the receiver having a sufficiently large diameter to receive and support the vertical support;
    one or more video cameras, the instructor-monitor, and the student-monitor each include at least one transceiver, the at least one transceiver being able to communicate wirelessly with the processor;
    the student-monitor and the instructor-monitor each include rectangular sunshades for preventing glare, such that each of the rectangular sunshades includes a top shade, a bottom shade, a left shade, and a right shade;
    each of the rectangular sunshades extends up to twenty inches from the student-monitor and alternatively the instructor-monitor;
    the student-monitor and the instructor-monitor each include antiglare screens; and
    both the student-monitor and the instructor-monitor each further include a camera selection means, the camera selection means being configured to enable the student-user and alternatively the instructor-user to select either the live video signal or the recorded video signal corresponding to at least one of the video cameras.

12. The surveillance network of claim 11, further comprising a set of instructions wherein surveillance network components are arranged as a kit.

13. A method of enabling a student and instructor to view the student's performance simultaneously, the method comprising the steps of:
  providing the surveillance network of claim 1;
  recording video footage via one or more video cameras;
  transmitting the live video signal from one or more video cameras to the processor;
  transmitting the live video signal from the processor to both the student-monitor and the instructor-monitor simultaneously;
  selecting at least one of video camera for viewing; and
  playing the recorded video signal for viewing.

* * * * *